United States Patent [19]

Anderson et al.

[11] Patent Number: 4,836,558

[45] Date of Patent: Jun. 6, 1989

[54] BULKHEAD SEAL

[75] Inventors: Milo D. Anderson, Fremont; Neil L. Holt, Foster City; Peter L. Larsson, Los Altos; Anthony R. W. Richardson, Los Altos Hills, all of Calif.

[73] Assignee: Raychem Corporation, Menlo Park, Calif.

[21] Appl. No.: 233,971

[22] Filed: Aug. 18, 1988

Related U.S. Application Data

[63] Continuation of Ser. No. 111,963, Oct. 20, 1987, abandoned.

[51] Int. Cl.$^4$ .......................... F16J 9/00; H01B 17/26
[52] U.S. Cl. ..................................... 277/1; 174/153 R
[58] Field of Search ........................... 277/1; 285/158; 174/152, 153

[56] References Cited

U.S. PATENT DOCUMENTS

| | | | |
|---|---|---|---|
| 3,243,835 | 4/1966 | Armentrout | 16/2 |
| 3,285,551 | 11/1966 | Tschanz | 248/56 |
| 3,423,518 | 1/1969 | Weagant | 174/153 |
| 3,518,359 | 6/1970 | Trimble et al. | 174/153 |
| 3,548,079 | 12/1970 | Jones et al. | 285/158 |
| 3,990,661 | 11/1976 | De Groef | 248/56 |
| 4,194,750 | 3/1980 | Sovish et al. | 277/208 |

Primary Examiner—Donald A. Griffin
Attorney, Agent, or Firm—Edith A. Rice; Herbert G. Burkard

[57] ABSTRACT

A seal is provided around one or more supply lines, such as pipes, wires or cables, extending through an aperture in a bulkhead. A heat recoverable tubular article having a radially extending flange is recovered onto the supply line. A resilient annular member is held in sealing engagement against the face of the flange. Fittings are positioned over the recovered article to sealingly engage the assembly to the bulkhead aperture.

9 Claims, 1 Drawing Sheet

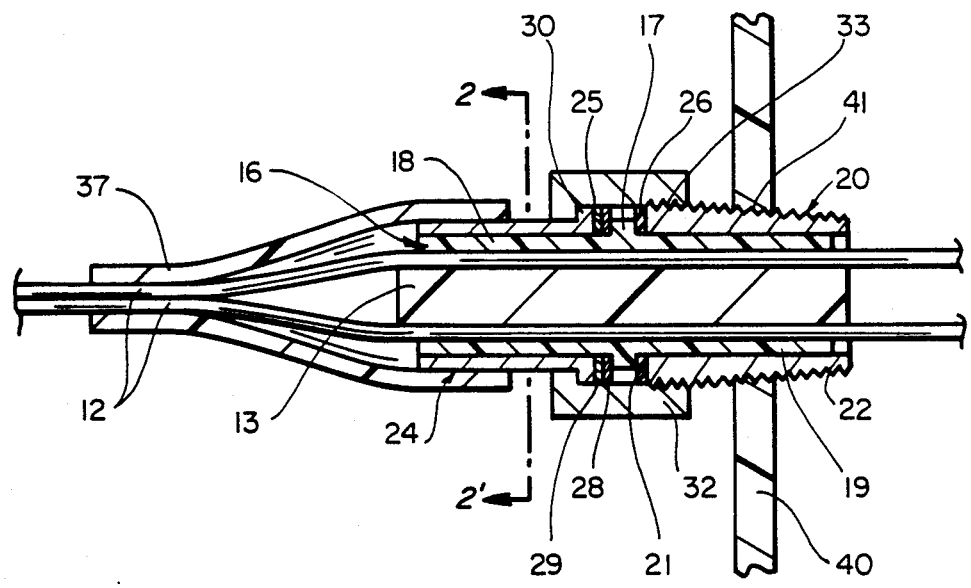
FIG_1
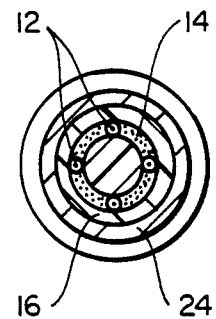
FIG_2

BULKHEAD SEAL

This application is a continuation of application Ser. No. 111,963, filed Oct. 20, 1978, and now abandoned.

BACKGROUND OF THE INVENTION

This invention relates to a gas-tight seal between one or more elongate supply lines and a bulkhead aperture through which they pass and to a method and an assembly for providing such a seal.

When one or more elongate supply lines, such as pipes, wires, cables and the like, pass through an aperture in a bulkhead or the like, a path for the ingress of gas or other fluids may be created between the supply line and the wall of the aperture. Further, if one or more supply lines, such as wires or cables, pass through the same bulkhead aperture, gases and/or fluids may flow in the spaces between the supply lines. In certain situations, it may be undesirable for gases and/or fluids to pass from one side of the bulkhead to the other through such leak paths. For example, in a nuclear generating plant it is desirable to prevent steam from the cooling system from entering various electrical equipment, junction boxes or the like, where the steam may cause corrosion, condensation of moisture resulting in short circuits, or the like. It is thus important that supply lines such as electrical wires entering the equipment through a wall or bulkhead be sealed to prevent ingress of steam.

SUMMARY OF THE INVENTION

This invention provides a gas-tight seal between one or more elongate supply lines and a bulkhead aperture through which it passes and a method and an assembly for providing such a seal.

One aspect of this invention comprises a method of forming a gas-tight seal between an elongate supply line and a bulkhead aperture through which the supply line passes, which method comprises:

a. recovering a heat recoverable tubular article over said supply line, said tubular article having a radial flange extending from an intermediate portion thereof dividing said tubular article into first and second longitudinal segments;

b. positioning a first tubular fitting around the first segment of the recovered member with one end thereof abutting the flange;

c. sealingly engaging the other end of the first fitting with the aperture of the bulkhead;

d. positioning a second fitting around the second segment of the recovered member, with one end thereof abutting the flange so that the flange is positioned between said first and second fittings;

e. positioning a resilient annular member between said first fitting and said flange;

f. positioning urging means between said second fitting and said flange to urge said flange, said resilient member and said first fitting into sealing engagement; and g. providing means for retaining said first and second fittings in their respective positions.

Another aspect of this invention comprises an assembly for forming a gas-tight seal between an elongate supply line and a bulkhead aperture through which the supply line passes, which assembly comprises;

a. a heat recoverable tubular article capable of being recovered onto said supply line and having a radial flange extending from an intermediate portion thereof, dividing said tubular article into first and second longitudinal segments;

b. a first fitting adapted to be positioned around the first segment of the article after it has been recovered onto the supply line, one end thereof being adapted to abut the flange and the other end thereof being adapted to be sealingly secured to the bulkhead aperture;

c. a second fitting adapted to be positioned around the second segment of the article after it has been recovered onto the conduit, one end thereof being adapted to abut the flange so that the flange is positioned between said first and second fittings;

d. a resilient annular member adapted to be positioned between said first fitting and said flange;

e. urging means adapted to be positioned between said second fitting and said flange to urge said flange, said resilient member and said first fitting into sealing engagement; and f. means for retaining said first and second fittings in their respective positions.

BRIEF DESCRIPTION OF THE DRAWING

FIG. 1 is a longitudinal cross-sectional view of a sealed feedthrough of this invention.

FIG. 2 is a radial cross-section of the feedthrough of FIG. 1 taken along the line 2—2'.

DETAILED DESCRIPTION OF THE INVENTION

In accordance with this invention, a seal is provided between one or more elongate supply lines and an aperture in a bulkhead through which it passes. The term "elongate supply line" is used herein to mean any elongate article which conducts electricity, oil, water, other fluids or the like, and passes through a bulkhead. One or more supply lines may pass through a single aperture in the bulkhead. The term "bulkhead" is used to mean any wall through which the supply line passes, whether from a building, room, electrical equipment cabinet or box or the like. The preferred embodiment of the invention described herein is a feedthrough for a plurality of wires going through the wall of an electrical junction box in a nuclear generating plant where steam is to be prevented from reaching the elecrical components within the box. It is to be understood that the invention is applicable to any supply line passing through any wall.

Referring now to the drawing, FIG. 1 shows a sealed feedthrough in which insulated wires 12 pass through the wall 40 of a junction box (not shown). As shown n FIG. 1 and 2, the individual wires 12 are arranged around a central rod 13, which is preferably polymeric, e.g. of polyethylene. Adhesive 14 fills the voids between the individual wires and the rod. The adhesive is preferably a hot melt adhesive, e.g. a polyamide or ethylene/vinyl acetate-based hot melt adhesive. Sleeve 16 surrounds the cables and the rod forming a gas-tight enclosure. Sleeve 16 has a radially extending flange 17 which divides the sleeve into two regions 18 and 19. Sleeve 16 is preferably a recovered, heat-recoverable polymeric tubular article, preferably of polyethylene or polyethylene blended with another polymeric material such as an ethylene/vinyl acetate copolymer. A first fitting 20 surrounds region 19 of the sleeve and end 21 of the first fitting abuts flange 17. The first fitting illustrated is a tapered metal transition nipple and is provided with threads 22 which are screwed in the mating threads 41 of the aperture. A sealing material, such as PTFE tape or pipe joint compound such as Neolube from Heron Industries Ltd. (not shown), is placed between the mating threaded portions. Other techniques of joining the fitting to the box can be used, for example, welding or soldering the fitting to the aperture, using the fitting and aperture shaped to provide an interference or press fit, or the like.

A second fitting 24 is positioned over region 18 of the sleeve, with end 25 abutting the flange. In the illustrated embodiment, the second fitting is a metal ferrule.

A resilient annular member 26 is positioned between the first fitting 20 and flange 17. The annular member is of a material such as an elastomer, preferably a silicone rubber. A flat washer 28 and a wave washer 29 are positioned between the flange 17 and the second fitting 24. The combination of these washers urges the flange, the resilient annular member and the first fitting into a gas-tight relationship. Other urging means may be used, for example a Belleville washer. The second fitting is provided with flange 30 and retaining clamp 32 fits over flange 30 and is threaded over the threads 33 of first fitting 20 to hold the first and second fittings in their respective positions maintaining the gas-tight seal between them. Other retaining means such as bolts, toggle clamps or the like may be used to hold the fittings together.

The end 36 of the second fitting 24 is sealed to the wires 12 by a second sleeve 37. The second sleeve may be a recovered, heat recoverable tubular polymeric article which tightly engages the end of the second fitting and the wires. Other enclosures can be used such as a convoluted conduit. The end 24 of the second fitting 24 can be adapted to interconnect with the enclosure selected.

The sealed feedthrough of FIG. 1 is assembled by placing wires 12 around center rod 13 and placing a hot melt adhesive 14 around the wires and rod. Then heat recoverable sleeve 16 is positioned over the rod and wires and heat is applied to cause the sleeve to recover (i.e. shrink) onto the wires and rod. The heat also causes the hot melt adhesive to melt and flow so that in cooling the voids between the wires and the rod are filled with adhesive. In the embodiment shown, two wires extend through the feedthrough. Depending on the particular application, more wires may be present and treated in a similar manner. If one wire or other supply line is used, the center rod may not be needed. The resilient member 26 is then placed next to flange 17 and the first fitting 20 is placed in position. The flat washer 28 and the ware washer 29 are then placed next to the other side of the flange 17 and the second fitting 24 is placed in position. Retaining clamp 32 is then installed over the first and second fittings. Heat recoverable sleeve 37 is positioned over the second fitting 24 and the wires and heat is applied to cause it to recover. The first fitting is then screwed into the aperture of the junction box wall 40.

What is claimed is:

1. A method of forming a gas-tight seal between an elongate supply line and a bulkhead aperture through which the supply line passes, which method comprises:
   a. recovering a heat recoverable tubular article over said supply line, said tubular article having a radial flange extending from an intermediate portion thereof dividing said tubular article into first and second longitudinal segments;
   b. positioning a first tubular fitting around the first segment of the recovered member with one end thereof abutting the flange;
   c. sealingly engaging the other end of the first fitting with the aperture of the bulkhead;
   d. positioning a second fitting around the second segment of the recovered member, with one end thereof abutting the flange so that the flange is positioned between said first and second fittings;
   e. positioning a resilient annular member between said first fitting and said flange;
   f. positioning urging means between said second fitting and said flange to urge said flange, said resilient member and said first fitting into sealing engagement; and
   g. providing means for retaining said first and second fittings in their respective positions.

2. A method in accordance with claim 1 wherein a plurality of supply lines pass through said bulkhead and said method further comprises applying adhesive around each supply line so that when heat is applied to recover the recoverable article onto the supply lines, the adhesive melts and flows, filling any voids between the supply lines and the supply lines and the recovered article.

3. A method in accordance with claim 1 or claim 2 which further comprises positioning a conduit over the supply line or supply lines and securing one end of the conduit to said second fitting.

4. A method in accordance with claim 1 wherein a plurality of supply lines pass through said bulkhead and said method further comprises positioning the supply lines substantially uniformly around a central rod, applying adhesive around the supply lines so that when heat is applied to recover the recoverable article onto the supply lines, the adhesive melts and flows, filling any voids between the supply lines, the rod, and the recovered article.

5. A method in accordance with claim 1, claim 2 or claim 4 which further comprises recovering a second heat recoverable tubular article onto said supply line or supply lines and said second fitting.

6. A method in according with claim 5 which further comprises positioning sealing material over at least one of said threaded sections prior to screwing said first fitting into the aperture.

7. A method in accordance with claim 1 wherein the first fitting and the aperature have mating threaded sections and said method further comprises screwing said first fitting into the aperture.

8. An assembly for forming a gas-tight seal between a supply line and a bulkhead aperture through which the supply line passes, which assembly comprises:
   a. a heat recoverable tubular article capable of being recovered onto said supply line and having a radial flange extending from an intermediate portion thereof, dividing said tubular article into first and second longitudinal segments;
   b. a first fitting adapted to be positioned around the first segment of the article after it has been recovered onto the supply line, one end thereof being adapted to abut the flange and the other end thereof being adapted to be sealingly secured to the bulkhead aperture;
   c. a second fitting adapted to be positioned around the second segment of the article after it has been recovered onto the supply line, one end thereof being adapted to abut the flange so that the flange is positioned between said first and second fittings;
   d. a resilient annular member adapted to be positioned between said first fitting and said flange;

e. urging means adapted to be positioned between said second fitting and said flange to urge said flange, said resilient member and said first fitting into sealing engagement; and
f. means for retaining said first and second fittings in their respective positions.

9. A sealed feedthrough in which a supply line extends through a bulkhead aperture which comprises:
  a. a supply line extending through an aperture in a bulkhead;
  b. a heat recoverable tubular article recovered onto said supply line and having a radial flange extending from an intermediate portion thereof, dividing said tubular article into said first and second longitudinal segments;
  c. a first fitting positioned around the second segment of the article, one end thereof abutting the flange and the other end thereof sealingly secured to the bulkhead aperture;
  d. a second fitting positioned around the second segment of the article, one end thereof abutting the flange so that the flange is positioned between the first and second fittings;
  e. a resilient annular member positioned between said first fitting and said flange;
  f. urging means positioned between said second fitting and said flange urging said flange, said resilient member and said first fitting into sealing engagment; and
  g. means retaining said first and second fittings in their respective positions.

* * * * *